(12) United States Patent
Yang

(10) Patent No.: US 8,681,058 B2
(45) Date of Patent: Mar. 25, 2014

(54) ANTENNA MODULE

(75) Inventor: Chun-Fei Yang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 211 days.

(21) Appl. No.: 13/080,642

(22) Filed: Apr. 5, 2011

(65) Prior Publication Data
US 2012/0169548 A1 Jul. 5, 2012

(30) Foreign Application Priority Data
Dec. 29, 2010 (TW) ................................ 99146587 A

(51) Int. Cl.
*H01Q 1/24* (2006.01)

(52) U.S. Cl.
USPC ........................................... 343/702; 343/743

(58) Field of Classification Search
USPC ........................................... 343/702, 743, 829
See application file for complete search history.

(56) References Cited

U.S. PATENT DOCUMENTS

| 6,937,205 | B2 | 8/2005 | Chou |
| 6,946,996 | B2 * | 9/2005 | Koyama ................. 343/700 MS |
| 7,161,543 | B2 * | 1/2007 | Cheng et al. .................. 343/702 |
| 2007/0085753 | A1 * | 4/2007 | Wu et al. ........................ 343/841 |
| 2009/0315788 | A1 * | 12/2009 | Hirota ............................ 343/702 |
| 2011/0193754 | A1 * | 8/2011 | Schlub et al. ................. 343/702 |
| 2012/0176280 | A1 * | 7/2012 | Chen et al. .................... 343/702 |

FOREIGN PATENT DOCUMENTS

| CN | 101355192 A | 1/2009 |
| TW | 574767 | 2/2004 |

OTHER PUBLICATIONS

Office action mailed on Nov. 20, 2013 for the China application No. 201110001854.8, p. 3 line 3-36, p. 4-5 and p. 6 line 1-20.
Office action mailed on Nov. 27, 2013 for the Taiwan application No. 099146587, filed Dec. 29, 2010, p. 1 line 9-14, p. 2 and p. 3 line 1-5.

* cited by examiner

*Primary Examiner* — Ahshik Kim
(74) *Attorney, Agent, or Firm* — Winston Hsu; Scott Margo

(57) ABSTRACT

An antenna module for an electronic device includes a shielding metal sheet for isolation of electromagnetic interference, and an antenna placed on the shielding metal sheet for radio signal reception and transmission, wherein the shielding metal sheet includes a first ground point working as a ground point of the antenna module and the antenna includes a first feeding point working as a feeding point of the antenna module.

12 Claims, 4 Drawing Sheets

ANTENNA MODULE

BACKGROUND OF THE INVENTION

1. Field of the Invention

The present invention relates to an antenna module, and more particularly, to an antenna module capable of lowering production costs, and enhancing antenna performance.

2. Description of the Prior Art

Along with the popularity of wireless communication, an antenna has become one of the essential elements of a portable electronic product, such as a mobile phone, personal digital assistant (PDA), laptop, and satellite navigation device, etc. In general, the antenna has one or two signal contacts, such as a feeding point and ground point, for electrically connecting to a circuit board in an electronic device, to transmit or receive radio signals.

Due to mobility-oriented quest, portable electronic products are constantly inclined toward compact and less spatial development. Thus, transceiver features and production cost of an antenna used for radio signal reception and transmission in the electronic products has to be taken into consideration in respects to both design and manufacture. Antenna structures usually accommodate to shapes of the electronic products, and therefore, for the sake of convenience, the antenna is usually positioned and fixed prior to connecting the signal contacts of the antenna to the circuit board by wiring and welding an adapter. In general, the antenna connects to the circuit board, through a high-frequency cable which provides a better impedance match and avoids signal deterioration. However, the high-frequency cable is more expensive, and hence increases production costs of the electronic products. In addition, operations of wiring have to be performed manually, causing costs of labors and time.

Take an antenna structure of a laptop for example, the antenna of the laptop is made from bending iron parts, and disposed on the front lid of the laptop in cooperation with a signal cable. Please refer to FIG. 1, which is a schematic diagram of an antenna structure of a conventional laptop 100. The laptop 100 includes a liquid crystal module (LCM) 110 and a mainframe 120. Aside from a liquid crystal screen, the LCM 110 have a symmetric antenna 140 disposed on both left and right ends of an upper side of the LCM 110. A feeding line of the antenna 140 is a high-frequency coaxial cable 142, such that high-frequency electric signals can be transmitted between the antenna 140 and a wireless module 130 in the mainframe 120. However, this antenna structure occupies spaces in the LCM 110, and thus causes defects of undesirable products sizes for laptops appealing to compactness. In addition, the high-frequency coaxial cable 142 has to be pulled out from a top of the LCM 110 to the mainframe 120, which increases wiring path of the cable and increases costs of the cable. Besides, increase of the wiring path of the cable causes more signal deterioration, and lowers overall communication quality, etc. On the other hand, due to increase of the wiring path of the cable caused by such antenna structure, in order to fasten the cable, fixation measures of the cable, e.g. hooks or retainers, have to be included in the LCM 110, which also increases production costs, and the wiring and positioning in an assembly process also rises assembly costs.

In this situation, in order to reduce production costs and enhance antenna performance, a new antenna structure design is needed.

SUMMARY OF THE INVENTION

It is therefore a primary objective of the present invention to provide an antenna module capable of lowering production cost, and enhancing antenna performance.

An embodiment of the invention discloses an antenna module for an electronic device. The antenna module includes a shielding metal sheet for isolation of electromagnetic interference, and an antenna, placed on the shielding metal sheet, for radio signal reception and transmission. The shielding metal sheet includes a first ground point working as a ground point of the antenna module, and the antenna includes a first feeding point working as a feeding point of the antenna module.

An embodiment of the invention further discloses an electronic device. The electronic device includes an antenna module including a shielding metal sheet for isolation of electromagnetic interference, and an antenna, placed on the shielding metal sheet, for radio signal reception and transmission. The shielding metal sheet includes a first ground point working as a ground point of the antenna module, and the antenna includes a first feeding point working as a feeding point of the antenna module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
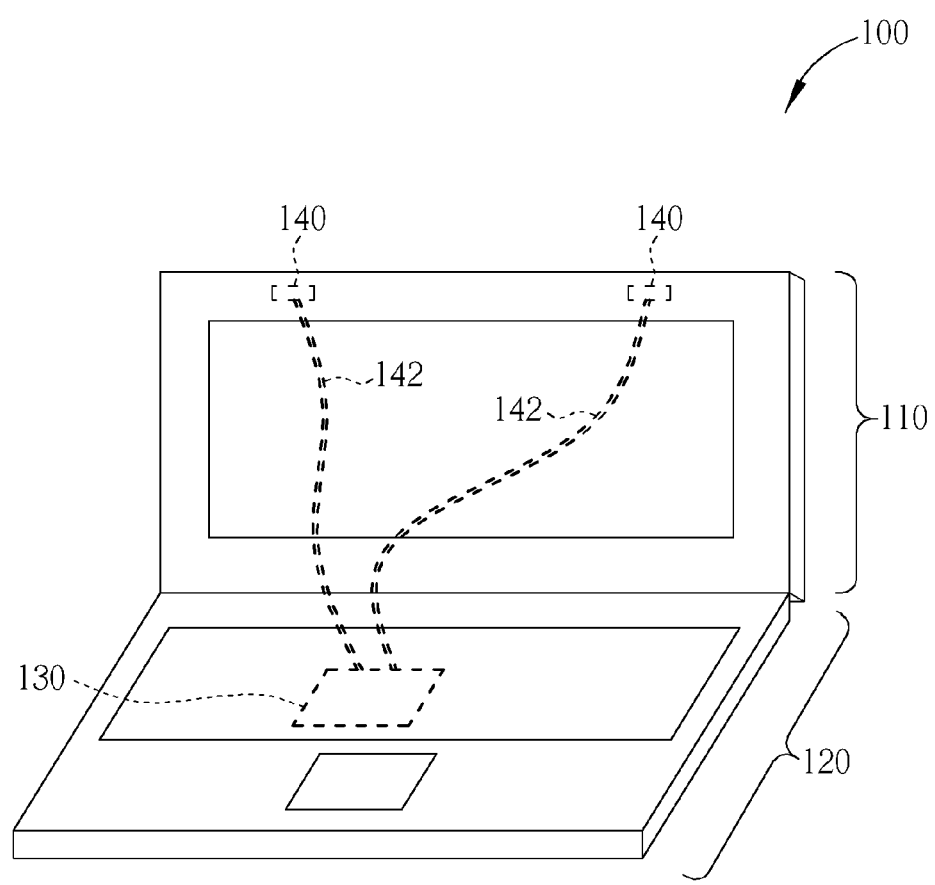
FIG. 1 is a schematic diagram of a conventional antenna structure.
Figure 2:
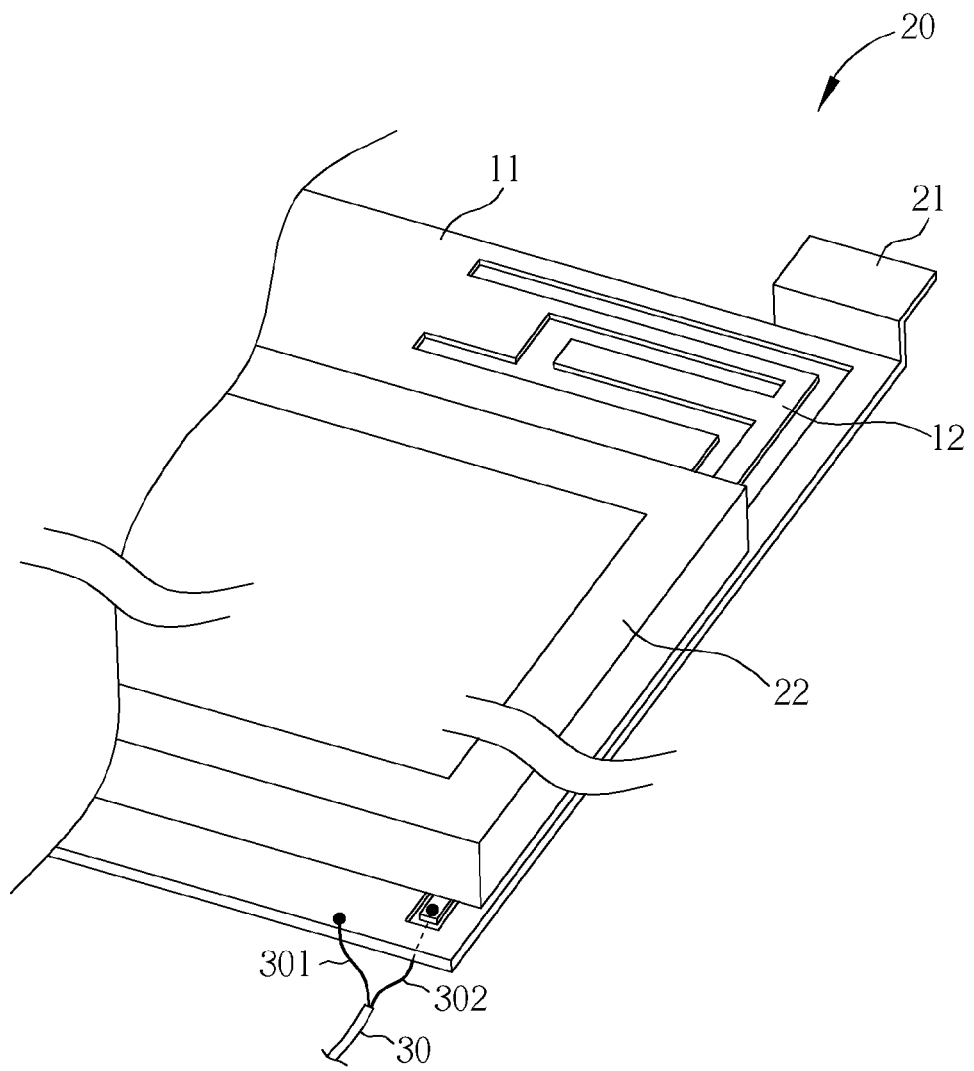
FIG. 2 is a schematic diagram of an antenna module according to an embodiment of the invention.

Please refer to FIG. 2, which is a schematic diagram of an antenna module 10 according to an embodiment of the invention. The antenna module 10 is used in a portable electronic device, such as a laptop, personal digital assistant (PDA), mobile phone, etc. In the embodiment, the antenna module 10 is utilized for a liquid crystal module 20 of a laptop. The antenna module 10 includes a shielding metal sheet 11 and an antenna 12. The shielding metal sheet 11 is placed on a back lid 21 of the liquid crystal module 20, for isolation of electromagnetic wave interference, and has a first ground point A1 working as a ground point of the antenna module 10 thereon. The antenna 12 is placed on the shielding metal sheet 11, for radio signal reception and transmission, and has a first feeding point A2 working as a feeding point of the antenna module 10 thereon. Therefore, the antenna module 10 connects to a circuit board (not shown) of the laptop via an antenna cable 30, wherein the antenna cable 30 includes a ground wire 301 connecting to the first ground point A1, and a center wire 302 connecting to the first feeding point A2, such that signals can be transmitted between the antenna 12 and the laptop.

On the other hand, a shape of the shielding metal sheet 11 is customized according to a shape of the electronic device, to dispose the shielding metal sheet 11 on the housing of the electronic device. For example, in the embodiment, the shielding metal sheet 11 can be an aluminum foil, copper foil, gold foil, iron foil or silver foil, which conforms to a shape of the back lid 21 of the liquid crystal module 20, to facilitate the shielding metal sheet 11 to be placed on the back lid 21.

Note that, the antenna 12 is placed on the shielding metal sheet 11, and thereby no space is required to be preserved in the back lid 21 or a front lid 22 of the liquid crystal module 20 to dispose the antenna, and thus, comparing to conventional antenna structures, internal space of the liquid crystal module 20 occupied by the antenna is reduced, so as to reduce product sizes. On the other hand, since the antenna is not limited to be disposed on a specific position on the shielding metal sheet 11, and thus a length of the antenna cable 30 can be shortened effectively, so as to lower material costs of the cable. More specifically, the first ground point A1 of the antenna module 10 is dispose on the shielding metal sheet 11 near an edge of the circuit board of the electronic device, e.g. laptop, and the first feeding point A2 is dispose on the antenna 12 near the first ground point A1, and thus the length of the antenna cable connecting the antenna module 10 and circuit board 30 is shortened, to reduce material costs of the cable and signal deterioration, and lowers difficulty of the assembly process, so as to reduce assembly process hours and costs.

Figure 3:
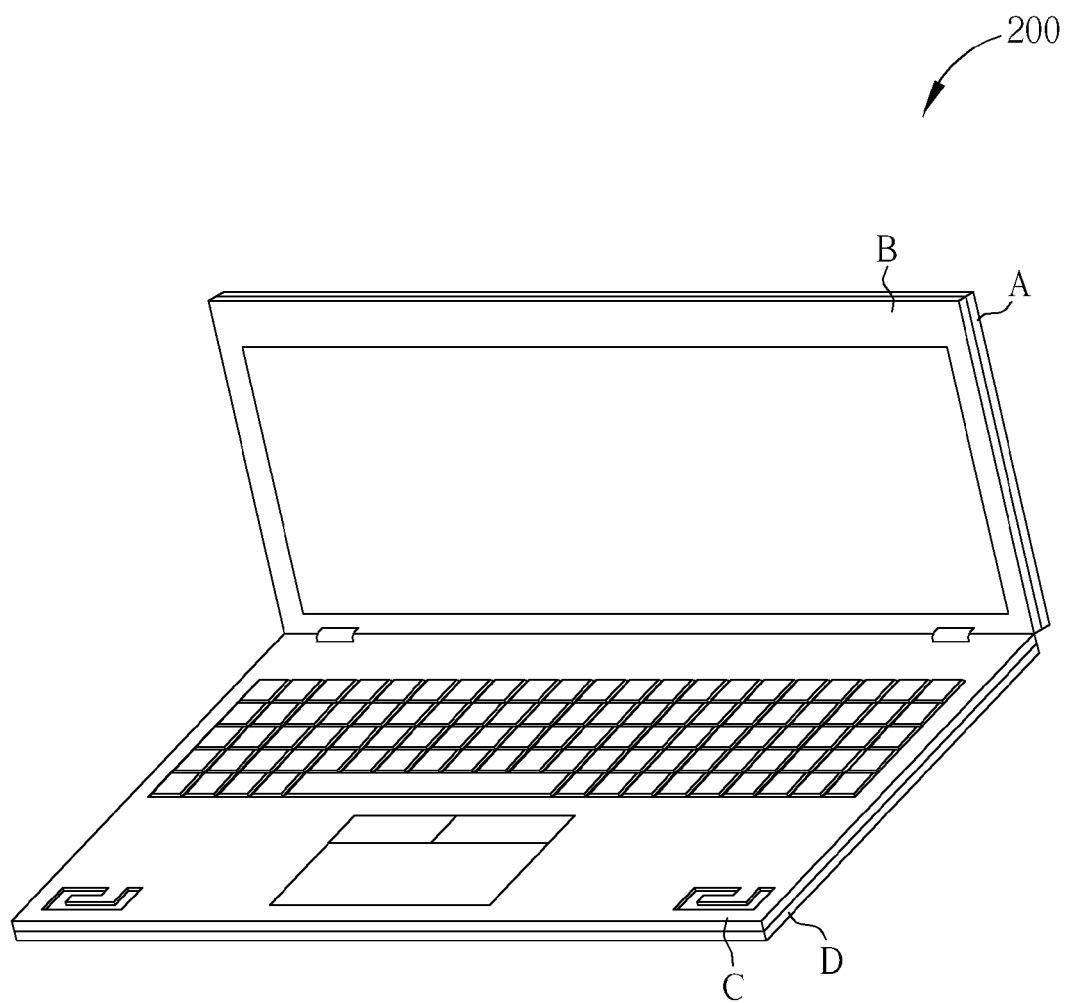
FIG. 3 is a schematic diagram of a laptop according to an embodiment of the invention.
Figure 4:
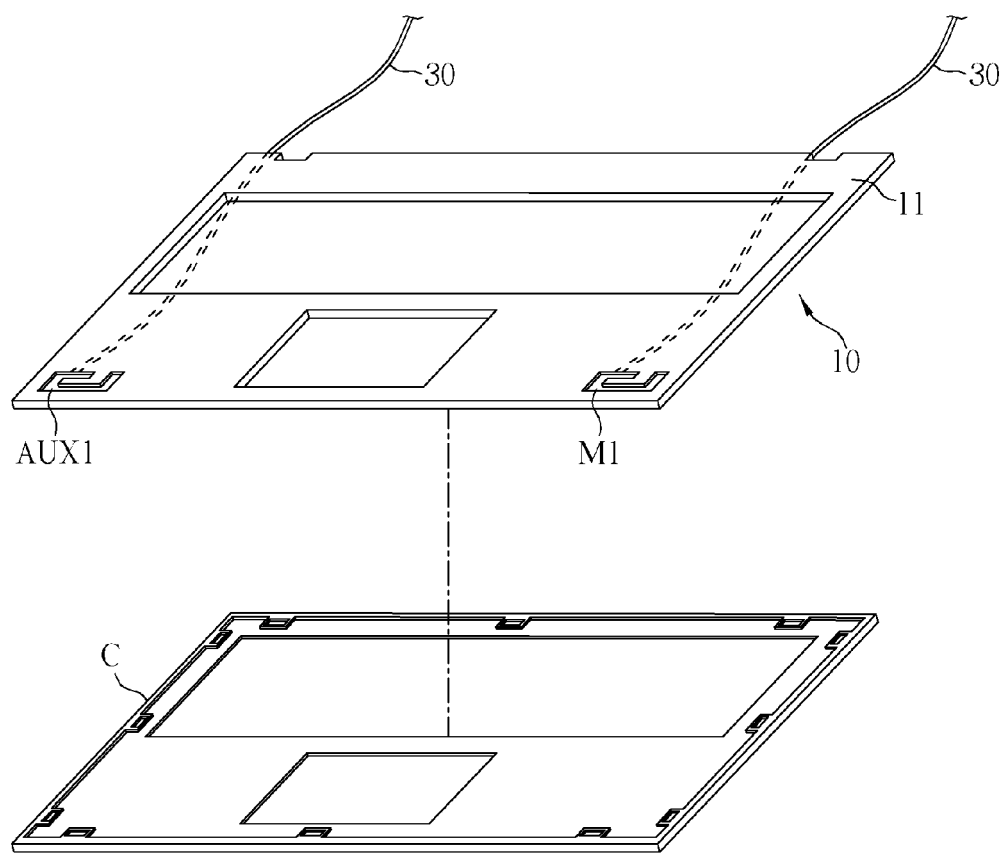
FIG. 4 is a schematic diagram of an antenna module according to another embodiment of the invention.

Besides the above mentioned the back lid 21 of the liquid crystal module 20, the antenna module 10 can be disposed on other parts of the housing of the laptop as well. Please refer to FIG. 3, which is a schematic diagram of a laptop 200 according to an embodiment of the invention. The laptop 200 includes a liquid crystal screen back lid A, a liquid crystal screen front lid B, a mainframe upper case C and a mainframe lower case D. The antenna module 10 is disposed on one of the liquid crystal screen back lid A, the liquid crystal screen front lid B, the mainframe upper case C and the mainframe lower case D. Take the mainframe upper case C of the laptop 200 for example, and please refer to FIG. 4, which is a schematic diagram of the antenna module 10 according to another embodiment of the invention. In this embodiment, the shielding metal sheet 11 is an aluminum foil, and a shape thereof conforms to a shape of the mainframe upper case C, to be placed on an inner surface of the mainframe upper case C, and antennas, e.g. main antenna M1 and auxiliary antenna AUX1, are symmetrically disposed on the aluminum foil, and connected to the circuit board of the laptop via antenna cable 30. Namely, the ground point and feeding point of the antenna module 10 can be disposed on the aluminum foil near the edge of the circuit board, so as to shorten the length of the antenna cable 30, to lower cost and enhance antenna performance. Detailed description can be referred from the above, and is not given herein.

To sum up, the invention saves internal space of an electronic device by disposing an antenna on a shielding metal sheet conforming to a shape of a housing of the electronic device, so as to reduce a size of the electronic device. In addition, a ground point and feeding point of the antenna module of the invention can be disposed in cooperation with a circuit board of the electronic device, and thus shortens a length of the antenna cable and lowers signal deterioration, which enhances antenna performance, and lowers assembly process difficulty and assembly hours, so as to lower production costs. Therefore, antenna structure of the invention saves internal space of the electronic device, lowers cost and achieves optimal reception.

Those skilled in the art will readily observe that numerous modifications and alterations of the device and method may be made while retaining the teachings of the invention.

What is claimed is:

1. An antenna module for an electronic device, comprising:
   a shielding metal sheet, for isolation of electromagnetic interference; and
   an antenna, formed in the shielding metal sheet by removing a corresponding antenna pattern from the shielding metal sheet, for radio signal reception and transmission;
   wherein the shielding metal sheet comprises a first ground point working as a ground point of the antenna module, and the antenna comprises a first feeding point working as a feeding point of the antenna module.

2. The antenna module of claim 1, wherein the electronic device is a laptop, a liquid crystal module, a personal digital assistant, or a mobile phone.

3. The antenna module of claim 2, wherein the antenna module is disposed on an exterior cover of a liquid crystal screen, an interior cover of the liquid crystal screen, an upper case of a mainframe, or an lower case of the mainframe of the laptop.

4. The antenna module of claim 1, wherein a shape of the shielding metal sheet comforts to a shape of a housing of the electronic device, to place on the housing.

5. The antenna module of claim 1, wherein the shielding metal sheet is an aluminum foil.

6. The antenna module of claim 1, wherein the electronic device comprises a circuit board, the first ground point is formed in the shielding metal sheet near the circuit board, and the first feeding point is formed on the antenna near the ground point.

7. An electronic device, comprising:
   an antenna module, comprising:
      a shielding metal sheet, for isolation of electromagnetic interference; and
      an antenna, formed in the shielding metal sheet by removing a corresponding antenna pattern from the shielding metal sheet, for radio signal reception and transmission;
      wherein the shielding metal sheet comprises a first ground point working as a ground point of the antenna module, and the antenna comprises a first feeding point working as a feeding point of the antenna module.

8. The electronic device of claim 7 is a laptop, a liquid crystal module, a personal digital assistant, or a mobile phone.

9. The electronic device of claim 8, wherein the antenna module is disposed on an exterior cover of a liquid crystal screen, an interior cover of the liquid crystal screen, an upper case of a mainframe, or an lower case of the mainframe of the laptop.

10. The electronic device of claim 7, wherein a shape of the shielding metal sheet comforts to a shape of a housing of the electronic device, to place on the housing.

11. The electronic device of claim 7, wherein the shielding metal sheet is an aluminum foil.

12. The electronic device of claim 7 further comprising a circuit board, wherein the first ground point is formed in the shielding metal sheet near the circuit boar, and the first feeding point is formed on the antenna near the ground point.

* * * * *